(12) United States Patent
Goetz et al.

(10) Patent No.: US 12,341,340 B2
(45) Date of Patent: Jun. 24, 2025

(54) POWER FLOW CONTROL MODULE FOR USE IN A LOW-VOLTAGE LOCAL NETWORK

(71) Applicant: Maschinenfabrik Reinhausen GmbH, Regensburg (DE)

(72) Inventors: Stefan M. Goetz, Kaiserslautern (DE); Jingyang Fang, Kaiserslautern (DE); Wolfram H. Wellssow, Ketsch (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 18/558,544

(22) PCT Filed: May 4, 2022

(86) PCT No.: PCT/EP2022/061939
§ 371 (c)(1),
(2) Date: Nov. 2, 2023

(87) PCT Pub. No.: WO2022/233915
PCT Pub. Date: Nov. 10, 2022

(65) Prior Publication Data
US 2024/0222975 A1    Jul. 4, 2024

(30) Foreign Application Priority Data
May 6, 2021   (DE) ..................... 10 2021 111 860.3

(51) Int. Cl.
*H02J 3/16*    (2006.01)
*H02J 3/00*    (2006.01)

(52) U.S. Cl.
CPC ................ *H02J 3/16* (2013.01); *H02J 3/007* (2020.01)

(58) Field of Classification Search
CPC .................................. H02J 3/16; H02J 3/007
See application file for complete search history.

(56) References Cited

U.S. PATENT DOCUMENTS 5,808,452 A * 9/1998 Gyugyi ................. H02J 3/1814
323/207
2010/0292863 A1   11/2010 Benchaib et al.
(Continued)

FOREIGN PATENT DOCUMENTS

DE      19733516 A1    2/1999
WO    2021013341 A1    1/2021

*Primary Examiner* — Carlos Amaya
(74) *Attorney, Agent, or Firm* — LEYDIG, VOIT & MAYER, LTD.

(57) ABSTRACT

A power flow control module adjusts a voltage or current in a line of an electrical network. The module includes: two module connections connecting to the line, switching elements, an energy storage, and two energy connections connecting to an energy source. The two module connections electrically connect the module in series with the line. Two of the switching elements are connected in series and are connected in parallel with the energy storage. The module is interconnected such that it is at a potential of the line of the electrical network and is galvanically isolated from a ground potential or another line of the electrical network. The switching elements are designed to increase or reduce an amplitude of the voltage in the line in order to adjust the voltage, to shift a phase of the voltage, or to control a current flow in the line.

18 Claims, 10 Drawing Sheets

(56) References Cited

U.S. PATENT DOCUMENTS

| | | | |
|---|---|---|---|
| 2018/0083447 A1* | 3/2018 | Lee | H02J 3/1814 |
| 2022/0271536 A1* | 8/2022 | Mueller | H02J 3/16 |
| 2022/0321041 A1* | 10/2022 | Ebrahimzadehveshareh | H02J 3/50 |

* cited by examiner

POWER FLOW CONTROL MODULE FOR USE IN A LOW-VOLTAGE LOCAL NETWORK

CROSS REFERENCE TO RELATED APPLICATIONS

This application is a U.S. National Phase application under 35 U.S.C. § 371 of International Application No. PCT/EP2022/061939, filed on May 4, 2022, and claims benefit to German Patent Application No. DE 10 2021 111 860.3, filed on May 6, 2021. The International Application was published in German on Nov. 10, 2022 as WO 2022/233915 A1 under PCT Article 21(2).

FIELD

The present disclosure relates to a power flow control module for use in electrical energy networks, in particular AC voltage networks having one or more phases, for adjusting the voltage and/or the current in a line of the electrical energy network.

BACKGROUND

The capacity utilization of electrical energy networks, in particular including medium-voltage and low-voltage networks, has been steadily increasing in recent years and is constantly changing. This is due, on the one hand, to distributed power generation and decentralized power infeed, for example by solar installations, and, on the other hand, to the increased use of charging stations for electric vehicles. Individual outputs of a distribution network station in a residential area or an industrial area may thus be overloaded. In order to avoid laying new lines with larger cross sections and the associated civil engineering work, voltage control may be carried out for example through controllable distribution network transformations. However, these are able to have only a very limited effect on the load flow in the outputs.

EP 3 413 422 proposes for example a distribution network station having a three-winding transformer in order to feed two separate busbars separately from a respective low voltage winding. This makes is possible to react to the power flow in the individual busbars.

Alternatively, controllable transformers may also be used. However, these require major modifications and an additional measuring unit in order to measure the voltage in the busbar of the low-voltage network and the current at the infeed of the low-voltage network. However, a controllable transformer is not able to selectively control individual supply phases.

Low-voltage distribution networks are often designed as meshed structures in order to guarantee a high level of supply reliability. In particular, in the case of low-voltage networks meshed in this way, the current flows via the individual feeders cannot be controlled, but rather arise passively according to the load. A mesh current controller may be used to change the voltage level of an output of the network, that is to say to raise or lower the voltage amplitude. The energy for this is generally drawn from the network itself. If the voltage is changed in a network segment, then the load may be distributed between the various supply lines. If for example the voltage is raised by a mesh current controller, then less current from potentially other network nodes flows into this segment and the main load is served via the output of the mesh current controller. When lowered again, the main load is shifted to other connections. Mesh current controllers thus turn out to be a proven means for actively shifting the load within a mesh. This is achieved in that the mesh current controller constitutes a voltage source in series with one or more phases, such that the current flows that cannot be controlled in the individual meshes due to diverse loads are able to be controlled via the individual feeders, which arise passively according to the load.

However, known mesh current controllers require at least one power transformer for series input coupling in order to provide a voltage between conductor and ground potential and to change the voltage amplitude. Such transformers are very large, heavy and expensive. They require a large installation space, meaning that they are no longer able to be accommodated in a normal switch cabinet or on a distribution network pylon, as is customary in the USA. The mesh current controllers also require additional transformers to enable feeding of the controller.

In addition to this, it has been shown that, although transformers are well-suited to low frequencies, higher frequency components give rise to unwanted losses. However, feeding in or drawing higher frequencies would make it possible to compensate for unwanted distortions in the network, such as for example harmonics, in order to improve the network quality. However, the known mesh controllers are not able to be used for such tasks. In addition, they are relatively inflexible and are able to influence only the fundamental wave. The voltages are often also able to be changed only in fixedly prescribed increments.

While meshing is highly desirable to ensure a high level of supply reliability, the current flows in the mesh are not able to be controlled with diverse loads, but rather arise passively according to the load. However, the known mesh current controllers have dimensions of the electromechanical controllers, with large transformers, that are unsuitable for the existing distribution cabinets, and only offer rigid solutions that require a new parameterization after each switching measure in the network. The present inventors have, therefore, recognized a need for structurally smaller and more cost-effective solutions that may be used to improve the network quality in meshed networks and to adjust the load distribution in meshed distribution networks.

SUMMARY

In an embodiment, the present disclosure provides a power flow control module for an electrical network that adjusts a voltage or a current in at least one line of the electrical network. The power flow control module includes: at least two module connections configured to connect to the line of the electrical network, a plurality of switching elements, an energy storage, and two energy connections configured to connect to an energy source. A first module connection and a second module connection, of the at least two module connections, are designed to electrically connect the power flow control module in series with a line of the at least one line of the electrical network. Two of the switching elements are connected in series and are connected in parallel with the energy storage. The power flow control module is interconnected such that it is at a potential of the line of the electrical network and is galvanically isolated from a ground potential or another line of the electrical network. The switching elements are designed to increase or reduce an amplitude of the voltage in the line in order to adjust the voltage, to shift a phase of the voltage or to control a current flow in the line accordingly.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
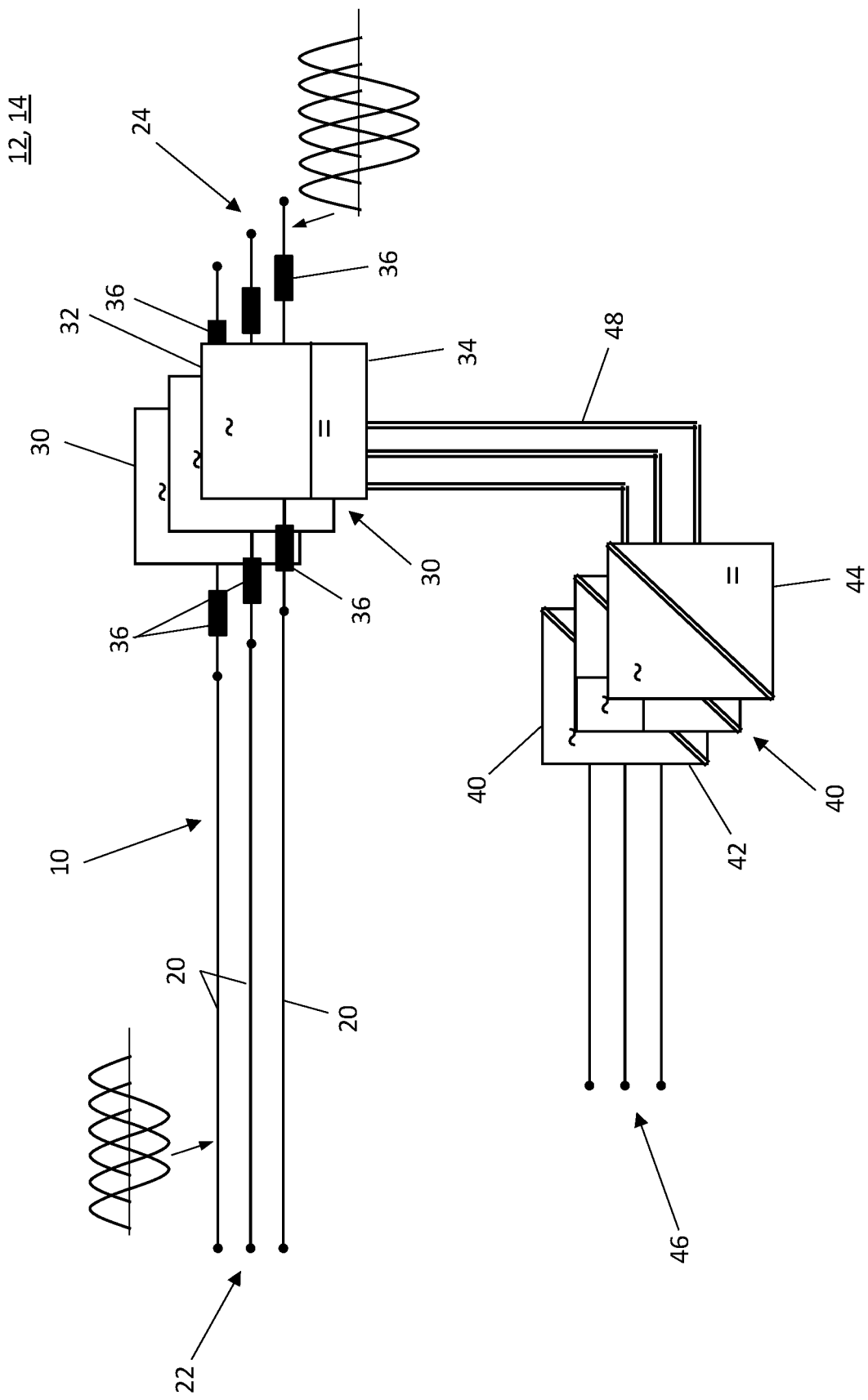
FIG. 1 shows a basic sketch of a network segment having a line and power flow control module.

Aspects of the present disclosure provide structurally smaller and more cost-effective solutions, as compared to the state of the art, that are useable to improve the network quality in meshed networks and to adjust the load distribution in meshed distribution networks.

In a first aspect, the present disclosure provides a power flow control module for use in an electrical network (AC energy network, for example low-voltage distribution network) and for adjusting the voltage and/or the current in a line of the network (for example low-voltage distribution network), comprising two module connections for connection to the line of the network (for example low-voltage distribution network), multiple switching elements, an energy storage unit and two energy connections for connection to an energy source. The first module connection and the second module connection are designed to electrically connect the power flow control module in series with the line, such that the power flow control module is connected in series with the line. Two of the switching elements are connected in series with one another and simultaneously connected in parallel with the energy storage unit. The power flow control module is connected such that it is at the potential of the line of the network and is galvanically isolated from a ground potential or another line of the network, for example of the low-voltage distribution network. In other words, the power flow control module is at the same potential as the line with which it is connected in series. The power flow control module thus floats with the voltage in the line to which it is interconnected. The electrical potential of the power flow control module moves relative to ground potential, for example in European low-voltage networks at 50 Hz and around 325 V peak voltage.

The energy storage unit is, in an embodiment, preferably a capacitor, for example an electrolytic capacitor, preferably a foil capacitor, which is inexpensive, or a ceramic capacitor. The ceramic capacitor is particularly preferred because it has a high energy density and a low internal resistance. Preferably, the capacitor used as energy storage unit has a capacitance of at least 100 pF, preferably of at least 1 mF, particularly preferably of at least 5 mF.

The switching elements of the power flow control module are designed to increase or reduce the amplitude of the voltage in the line, to shift the phase of the voltage or to feed in harmonics with certain frequencies, phases and amplitudes. As a result, the voltage in the line is adjusted or the current flow in the line is controlled accordingly.

The power flow control module has the advantage that it uses only switching elements to feed the desired voltage difference into the line in series. Because the switching elements for the series infeed and the power flow control module are provided in a manner floating with the network voltage, and thus have no ground reference and no connection to other lines or other phases in a three-conductor system, they need to handle only very low voltages. However, the switching elements have to handle high currents, but this is unproblematic at the same time as low voltages.

Within the context of the present disclosure, it is recognized that it is highly advantageous to interconnect the power flow control module in a manner floating with the network voltage. The modules move with the voltage of their phase (line) and build up only a small voltage difference between the first module connection and the second module connection. A power flow control module is used for each line or each conductor of a three-phase three-conductor system, that is to say connected in series with the line. The power flow control modules have no ground reference and are isolated from one another. Such a lack of ground reference, also referred to as galvanic isolation by a person skilled in the art, may also be a very high-resistance reference to ground or to other well-defined electrical potentials outside the power flow control module within the meaning of the disclosure. Such a high-resistance reference should in this case be at least 250 kΩ, in an embodiment, preferably at least 1 MΩ, and particularly preferably at least 10 MΩ. Any currents from a power flow control module to ground or at its electrical reference points outside the corresponding power flow control module are therefore only negligibly small and cause no significant losses. Such resistances, sometimes also referred to as "leakage resistances", may be formed by discrete resistance components, but also by sensors, for example insulation monitoring sensors. Likewise, (almost) complete isolation may be used, which usually only assumes leakage currents along (soiled) surfaces or through isolators and gigaohm resistances (see also the industrial standard IEC 60664, for example).

Because the power flow control module operates only relatively between the first module connection and the second module connection and has no ground reference, it never experiences the total voltage amplitude, but rather only the maximum voltage difference to be set. Due to the interconnection as a floating module, the switching elements may be low-voltage semiconductor components that are still able to conduct a few hundred amperes of current in a very small space. Large power transformers for high powers (several 100 kVA), which provide high currents (greater than 100 A) and the required rated voltage (for example greater than 220 V for distribution networks) to ground potential, are dispensed with completely.

In one preferred embodiment of the power flow control module, the absolute value of the voltage that is provided for changing the amplitude of the voltage in the line is at most one third of the phase peak voltage of the line. Preferably, the voltage that is provided is less than or equal to one fifth of the phase peak voltage, very preferably at most one tenth. For low-voltage distribution networks as an application, the absolute value of the voltage that is provided is at most 100 V, preferably at most 50 V, and particularly preferably at most 25 V. In further preferred embodiments, the voltage difference, and thus the voltage of the power flow control module that is provided, is at most 20 V, very preferably at most 15 V. In many cases, the requirements of the power flow control module are such that the maximum voltage to be provided is at most 6% of the rated voltage of the line with which the power flow control module is connected in series.

In the context of the present disclosure, it is recognized that, due to the use of the power flow control module as a floating module, this module may be designed as a power electronics solution. The power flow control module has to have only a very low rated power in order to still be able to serve a network segment of a low-voltage distribution network with very high powers.

In one preferred embodiment, the power flow control module has switching elements that are interconnected in the form of half-bridges. Preferably, provision is made for four switching elements, which are preferably interconnected in the form of two half-bridges. Both half-bridges are preferably connected in parallel with the energy storage unit.

In one preferred embodiment, the switching elements are designed as transistors or power transistors, preferably as low-voltage transistors or as extra-low-voltage transistors. By way of example, field-effect transistors (FETs), for example low-voltage trench transistors with vertical current flow, as are known for instance from the automotive sector, may preferably be used.

For low-voltage distribution networks, in an embodiment, the switching elements are preferably designed as low-voltage silicon FETs. As an alternative, it is possible to use gallium nitride FETs or gallium nitride FETs on silicon substrates, for example with lateral current flow. For applications with higher voltages such as the medium-voltage distribution network, the switching elements may furthermore preferably be designed as silicon carbide FETs, preferably with blocking voltages over 200 V, particularly preferably over 600 V, more preferably over 1700 V. As an alternative to silicon carbide FETs, insulated-gate bipolar transistors (IGBTs) may furthermore also be used within the context of the disclosure.

One preferred embodiment of the power flow control module makes provision that it is possible to shift the phase of the AC voltage between the two module connections that are connected to the line. The power flow control module is preferably able to shift the phase both in the negative direction and in the positive direction, depending on the requirement of the network.

In one preferred embodiment, the power flow control module is operated in a voltage-controlled manner. It is therefore used such that a voltage is added in series to the voltage prevailing in the line of the network. It is thereby possible to adjust a voltage drop in a line of the network or on a network segment, such that the network quality is easily able to be restored or maintained.

In one embodiment that is likewise preferred, the power flow control module is used as a current-controlled voltage source. It is thereby possible to inject a current into the line into which the power flow control module is connected, such that the total current flowing in the line is able to be influenced in a desired manner. If for example, in a segment or in a line of a mesh of a network segment, the current flow is significantly higher than in a parallel line of the segment, then the current in the corresponding line may be adjusted by the power flow controller such that an almost balanced current flows in both lines.

In one preferred embodiment, the switching elements of the power flow control module that are used are clocked. Clocking is preferably carried out by way of a pulse width modulation.

The switching elements are preferably clocked at a switching rate of at least 10 KHz. When using silicon FETs with a blocking voltage of under 200 V (preferably under 100 V) or silicon carbide FETs with a blocking voltage of over 200 V (preferably over 600 V), the switching rate is preferably at least 20 kHz, particularly preferably at least 50 kHz or 100 kHz. When using gallium nitride FETs, the switching rate is preferably at least 100 kHz, very preferably at least 250 kHz and particularly preferably at least 500 kHz. As the switching rate increases, the need for line filters, for example inductors, on module connections decreases. When using a high switching rate, for example over 500 kHz, as is able to be achieved inter alia with gallium nitride FETs, but sometimes also with silicon carbide and silicon FETs, it is preferably possible to dispense completely with dedicated line filters, because the parasitic inductance of the line is sufficient to generate only small unwanted current ripple at these switching rates. The parasitic inductances perform the function of line filters in this embodiment.

One embodiment that is likewise preferred of the power flow control module makes provision for an energy source that is connected to the energy connections. The energy source is needed to provide the necessary energy to raise the voltage in the line of the network. The energy source may be for example a battery that is preferably connected to the energy connections of the power flow control module by way of an interposed DC-DC converter, or may be a power supply unit or other electrical energy source.

In the context of the disclosure, it has been recognized that a power electronics solution for the power flow control module has to have only very low rated powers in order still to be able to generate a very high power in the line of the network. It has also been recognized that the locations with high voltage requirements within the power flow control module are able to be isolated from the locations with a high current requirement by way of a clever circuit. Reactive powers may thereby be kept out of the circuit. The solution according to aspects of the present disclosure in this case dispenses with any (large and heavy) power transformers at fundamental frequency. The feed is formed by the power electronics of the power flow control module, that is to say by the switching elements, and fed with a preferably modern energy source. A modern power supply unit technology may for example be used as energy source, and preferably also provides galvanic isolation in a compact manner at harmonics.

In one preferred embodiment, the power flow control module therefore comprises at least one galvanically isolating power supply unit, which is connected to the energy connections. However, it may also be expedient to have multiple power supplies in some cases.

The power supply units are preferably designed in this case such that the intermediate circuit formed thereby is able to be kept at very low voltages for the power flow control module. These are for example at most one third of the network peak voltage, preferably at most one fifth, more preferably at most one tenth and very preferably at most one fifteenth. In the case of low-voltage distribution networks, these are for example at most 100 V DC, preferably at most 60 V, more preferably at most 30 V and very preferably at most 15 V.

The galvanic isolation by way of the power supply units ensures that the power flow control module is able to float with the voltage on the line of the distribution network with which the power flow control module is connected in series. In other words, the electrical potential of the power flow control module always assumes the voltage prevailing in the line.

The floating of the power flow control modules, that is to say the harmonization with the voltage prevailing in the connected line, additionally has the advantage that overvoltages are unproblematic. This circuit also offers good protection against lightning that enters the distribution network or the distribution network. Low-voltage distribution networks are in some cases very hard to protect against lightning strikes. Medium-voltage lines are embodied, at least in rural areas, as overhead lines with conductor cables located close to one another. Underground lines of the low-voltage distribution network are likewise affected, since distribution network transformers transmit the voltage peaks that occur.

Due to the lack of ground reference of the power flow control module and the galvanic isolation of the electronic switching elements and the circuit connected thereto (electronic phase feed modules) as well as the lack of potential reference to one another, that is to say between multiple power flow control modules, the power flow control modules follow each voltage change. In other words, they thus also follow a voltage peak of a lightning strike or other potential fluctuations in the same way. The power flow control module follows the potential peak, even if it assumes several thousand volts, for example. The voltage of one point of the power flow control module accordingly increases by the ground voltage at the same time. The relevant voltage differences or differential voltages between the points within the power flow control module however remain constant, meaning that the power flow control module is still able to be constructed using only components with a significantly lower rated voltage than the phase peak voltage, for example low-voltage components for distribution networks, that is to say low-voltage switching elements such as transistors and low-voltage capacitors, etc.

The design of the power flow control modules exclusively with power electronics and in this case with low-voltage components additionally has the advantage that the power flow control modules are of very small design in terms of space. For example, their dimensions are significantly smaller than those of a Euro circuit board. Due to the small structural size, no large capacitive or inductive voltage differences, which may lead to damage, are able to build up within the power flow control module either. This is a further advantage of the power flow control modules implemented according to aspects of the present disclosure.

A further preferred embodiment of the power flow control module comprises a power supply unit having a DC-DC converter, wherein the power supply unit is preferably fed from the low-voltage distribution network. No separate current connection or separate energy source is thus necessary. The power supply unit is particularly preferably fed from the line to which the power flow control module is connected. In a further preferred embodiment, the DC-DC converter comprises an LLC circuit, as is known to a person skilled in the art.

A further preferred embodiment of the power flow control module according to aspects of the present disclosure has a power supply unit that comprises a rectifier circuit. Rectifiers within the context of the disclosure are understood to mean all circuits that are able to convert and/or exchange energy between an AC voltage side having any number of phases and a DC voltage side having at least one DC voltage intermediate circuit having one or more power flow directions. By way of example, a rectifier, an inverter, an active front end or the like could be used here. Preferably, a unidirectional rectifier is installed here. A power supply unit that has a power factor correction (PFC) circuit is likewise preferred. A power factor correction stage ensures for example that preferably uniform sinusoidal loading on the AC side of the power supply unit is guaranteed. The power factor correction circuit may be formed for example as a boost power factor correction circuit (also called boost PFC) known to a person skilled in the art in conjunction with a rectifier, preferably a diode rectifier, or likewise as what is known as a bridgeless power factor correction circuit (bridgeless PFC), which usually itself already performs the function of a unidirectional rectifier with a network current that is as sinusoidal as possible.

One embodiment of the power flow control module that is likewise preferred comprises a heating resistor. This optional heating resistor may be used for example to consume energy. This occurs when the voltage difference multiplied by the current in the floating power flow control modules becomes negative, and energy therefore has to be drawn from the power flow control modules. The heating resistor may preferably be located in the power flow control module. One alternative and likewise preferred embodiment makes provision for the heating resistor to be able to be arranged upstream of a DC-DC converter in the intermediate circuit.

In one embodiment that is likewise preferred, the power flow control module comprises a high-frequency transformer. The frequency thereof is preferably at least 100 Hz, more preferably at least 400 Hz. In one embodiment that is likewise preferred, the transformer operates at frequencies of at least 1 kHz, preferably at least 10 kHz and very preferably at least 100 kHz. The choice of the operating frequency of the transformer is down to a person skilled in the art depending on the respective application case and, for example, also depending on the used frequency of the voltage in the line of the distribution network.

According to a further aspect, the disclosure relates to a power flow control system for controlling the load distribution in a network or in a network segment, for example a low-voltage distribution network, a medium-voltage distribution network or a network segment of a low-voltage distribution network or medium-voltage distribution network, with a line. The power flow control system comprises a power flow control module, for instance as described above, and an energy source for supplying energy to the power flow control module in order to change or adjust the amplitude of the voltage in the line of the low-voltage distribution network or to control the load distribution or the current flow in the line.

According to a further aspect, an aspect of the present disclosure relates to an electrical network or AC energy network, preferably a low-voltage distribution network, or a network segment of an electrical network, for example a low-voltage distribution network segment of a low-voltage distribution network. The network segment, according to an implementation according to aspects of the present disclosure, has a line or three lines of a three-conductor system, which is connected to a (distribution) network transformer and to which multiple consumers and/or (decentralized) infeed sources are connected. The network segment has, for each line, a power flow control module that is preferably designed according to one of the aspects and embodiments described above and is connected in series into the line of the network, for example a low-voltage distribution network.

In the network segment according to an aspect of the present disclosure, the power flow control module is connected to the line of the network by way of two module connections and comprises multiple switching elements, an energy storage unit and two energy connections for an energy source. The two switching elements of the power flow control module are connected in series and in parallel with the energy storage unit. The power flow control module is interconnected here such that it is at the potential of the line of the electrical network, for example a low-voltage distribution network, and is galvanically isolated from a ground potential or another line of the network. The power flow control module with its switching elements is designed to influence the amplitude of the voltage in the line, preferably to increase or reduce it, in order to adjust the voltage of the line of the network or to control the current flow in the line according to the prescribed wishes. It is thereby easily possible to ensure the quality of the network and the quality of the power supply in the distribution network segment. Since the power flow control module is at the same potential as the line, only small voltages need to be provided by the power flow control module in order to adjust the voltage on the line. This has the advantage that the switching elements may be designed as low-voltage switching elements or low-voltage transistors. However, they must be able to handle large currents of preferably greater than 500 A at low voltages. However, since the large currents are to be applied in combination with low voltages of less than 50 V, preferably less than 20 V, very preferably less than 10 V, the power flow control module is very small overall and has only a very low weight (less than 5 kg, preferably less than 1 kg, very preferably less than 0.5 kg). It may therefore be installed on any conventional switch cabinet in a distribution network. No further structural measures are necessary. It is thus in particular likewise possible to dispense with the use of large power transformers as well as with changing the line cross sections in the distribution network segment in order to be able to handle the higher loads that occur. On the contrary, the voltage and current are adjusted in the desired ranges in the network segment according to aspects of the present disclosure by using the power flow control module according to aspects of the present disclosure.

The abovementioned features and the features still to be explained below are applicable not only in the respectively indicated combination, but also in other combinations or on their own, without departing from the scope of the present disclosure.

Galvanic isolation is understood to mean either complete galvanic isolation, for example via a transformer, or isolation via a resistance to ground of at least 250 kΩ (kilo-ohms), preferably at least 1 MΩ (mega-ohms), very preferably >10 MΩ.

The disclosure will be described and explained in more detail below with reference to a few selected exemplary embodiments in connection with the accompanying drawings. Reference is made here by way of example to a low-voltage distribution network as one possible example of an electrical AC voltage network, without restricting the generality of a distribution network.

FIG. 1 shows a three-phase network segment 10 having three lines 20, wherein the network segment 10 is part of an electrical network 12. A distribution network segment 11 of a low-voltage distribution network 14 is shown by way of example here.

In each line 20, a power flow control module 30 is connected in series, this having an AC part 32 and a DC part 34. Optional line filters 36 are provided in each case between the power flow control module 30 and the line 20, and may be designed as inductors or as PL filters.

Each of the power flow control modules 30 is connected to a power supply unit (also referred to as a power supply) 40, each having an isolating output. The power supply units 40 may be fed from any voltage source or energy source, wherein an AC part 42 of the power supply unit 40 may be connected to an energy source, which may be arranged at the connections 46. The energy sources may be of different kinds.

Between a DC part 44 of the power supply unit 40, there is a connection, by way of two conductors 48, to the DC part 34 of the power flow control module 30.

FIG. 1 shows that the voltage at an input side 22 (referenced to the power flow control module 30) has a different form, that is to say a different amplitude than the output voltage at an output side 24. The voltages of the three phases are each illustrated schematically.

Figure 2:
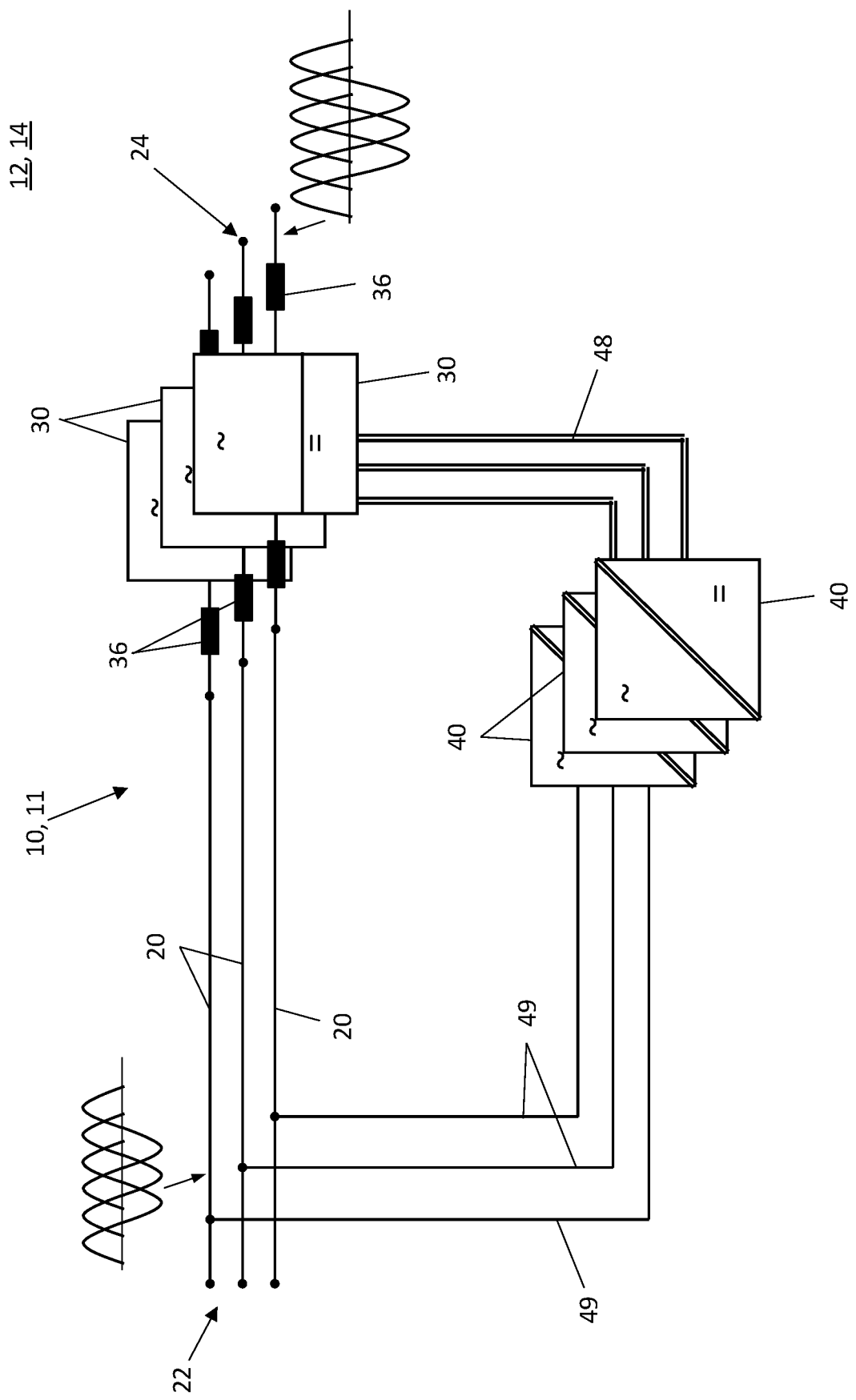
FIG. 2 shows a basic sketch of an alternative network segment or distribution network segment.

FIG. 2 differs from FIG. 1 in that the power supply units 40, which may in principle be fed from any possible source, are fed in this embodiment from the input side 22 of the network segment 10. For each phase, a conductor 49 is therefore connected to the respective line 20 in order to supply energy to the power supply units.

In the embodiments shown here according to FIGS. 1 and 2, the power flow control modules 30 are connected into the line 20 such that they float with the voltage level of the lines 20. The power flow control modules are thus at the respective voltage level of the line with which they are connected in series.

In a preferred embodiment, the power flow control modules 30 are designed such that they are able to handle only small voltages, preferably voltages less than 50 V, very preferably less than 20 V, particularly preferably less than 15 V. On the other hand, however, it is possible to handle very high currents, generally currents greater than 500 A. The power supply units 40 ensure galvanic isolation, such that the power flow control modules 30 are able to float with the voltage in the lines 20. The power flow control modules 30 therefore have no ground reference and also connection to any phase or line 20 other than the line with which they are connected in series. The power flow control modules 30 move in accordance with the voltage in their line, and therefore only have to be able to handle a small voltage difference between the input and the output of the modules. The power flow control modules 30 do not "see" the total voltage amplitude of the line 20, since they are arranged relatively between the input and output of the line 20. Only the maximum voltage difference to be set plays a role for them. Low-voltage switching elements, for example low-voltage semiconductor components, may therefore be used, these still being able to conduct a few hundred amperes of current in a very small space.

In addition to the three power supply units 40 shown here, that is to say a power supply unit 40 for each phase or line 20, it would also be possible to use a power supply unit that feeds all three power flow control modules 30. However, galvanic isolation must be present between the individual lines 20.

Figure 3:
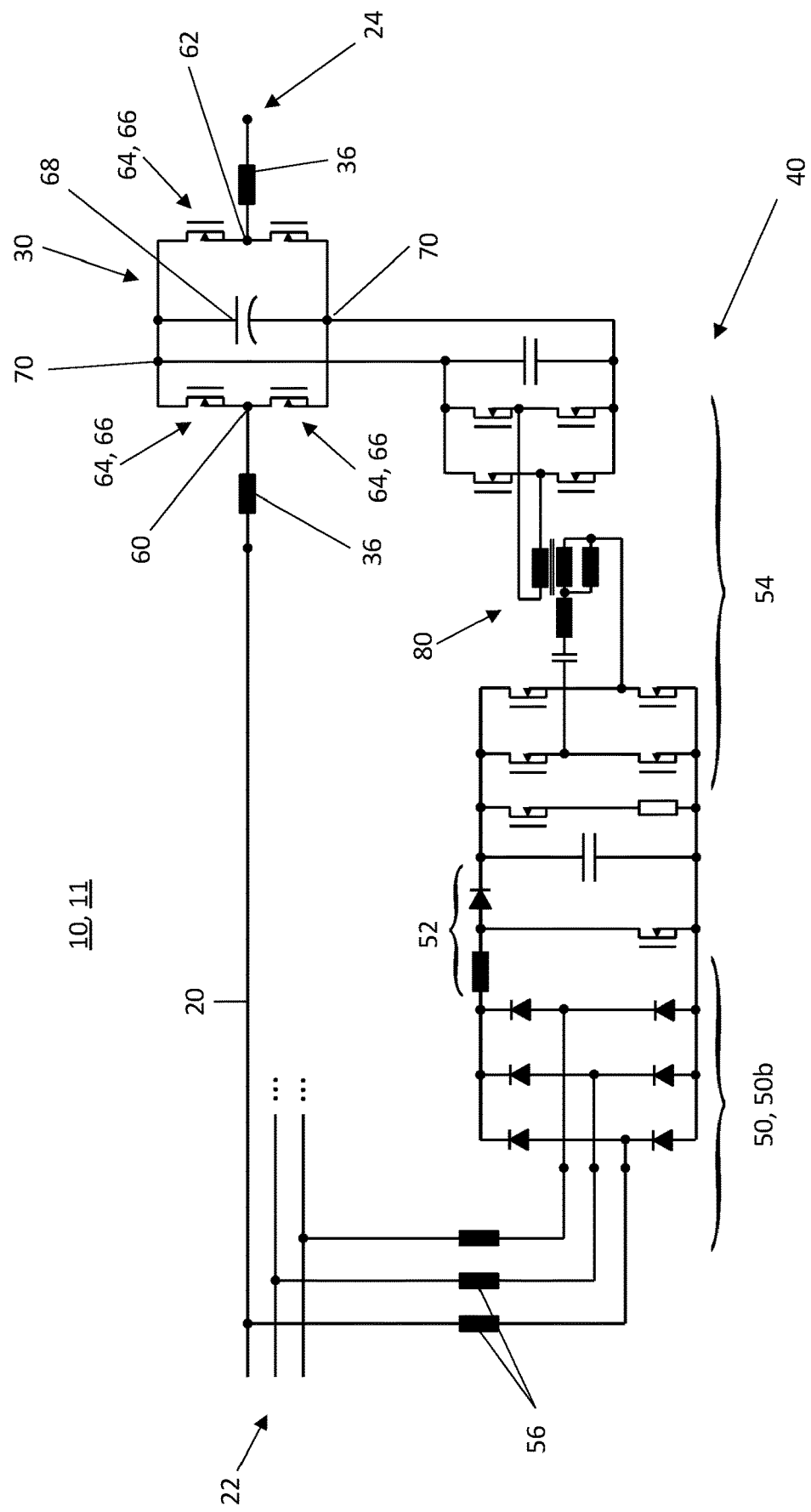
FIG. 3 shows a detailed sketch of the network segment from FIG. 2.

FIG. 3 shows one embodiment of a power flow control module 30 having a power supply unit 40 in detail for a line 20 of the three-phase network segment 10, for example a distribution network segment 11. The power flow control module 30 is shown in detail. It comprises a first module connection 60 that is connected to the line 20 on the input side 22, and a second module connection 62 that is connected to the output side 24 of the line 20. A respective line filter 36 (for example inductor) may be arranged between the line 20 and the respective module connection 60, 62. The power flow control module comprises multiple switching elements 64, which may be designed as low-voltage FETs (field-effect transistor), for example as low-voltage silicon FETs. In the example shown here, the switching elements 64 are designed as transistors 66, wherein in each case two transistors are connected in series and in parallel with an energy storage unit (also referred to as an energy storage) 68. The switching elements 64 are interconnected in the form of two half-bridges. The switching elements may be clocked, preferably at a clock rate of at least 20 kHz, more preferably at least 100 kHz, particularly for example in an embodiment, preferably at least 250 kHz. The switching elements 64 are, in an embodiment, preferably transistors based on gallium nitride (GaN) with the advantage that the inductances 36 become very small (roughly proportional to the characteristic value of the switching rate, 1/switching rate), or even the parasitic inductance of the lines (which indeed also build up a small magnetic field around themselves that is sufficient if the switching rate is sufficient) is sufficient as a filter.

The power supply unit 40 is connected to the power flow control module 30 at two energy connections 70. The power supply unit comprises, in the embodiment shown here, a rectifier circuit 50, here a (unidirectional) rectifier 50b, which, for uniform loading, is fed from all three phases of the network segment 10, that is to say, in other words, is connected to all three lines 20 of the network segment 10 or distribution network segment 11. The (unidirectional) rectifier circuit 50 is designed here as an active front end. High voltages, greater than 200 V, but only low currents (less than 50 A), may be handled here. The rectifier 50 of the power supply unit 40 is thus in contrast to the power flow control module 30, in which specifically only small voltages (preferably less than 50 V) are handled, but large currents over 500 A.

In principle, the rectifier could also be feed from only one phase. The power supply unit 40 furthermore preferably comprises, on its AC side, a power factor correction stage 52, referred to as a PFC stage, to achieve uniform sinusoidal loading. In addition, provision is made, in the power supply unit, for a DC-DC converter 54, which is designed as an LLC circuit according to FIG. 3. The DC-DC converter must have at least one isolated output per power flow control module 30 for a line 20. The power supply used here is thus similar to typical power supply units. Provision may additionally be made, on the AC side, for a line filter 56, for example in the form of inductors.

Figure 4:
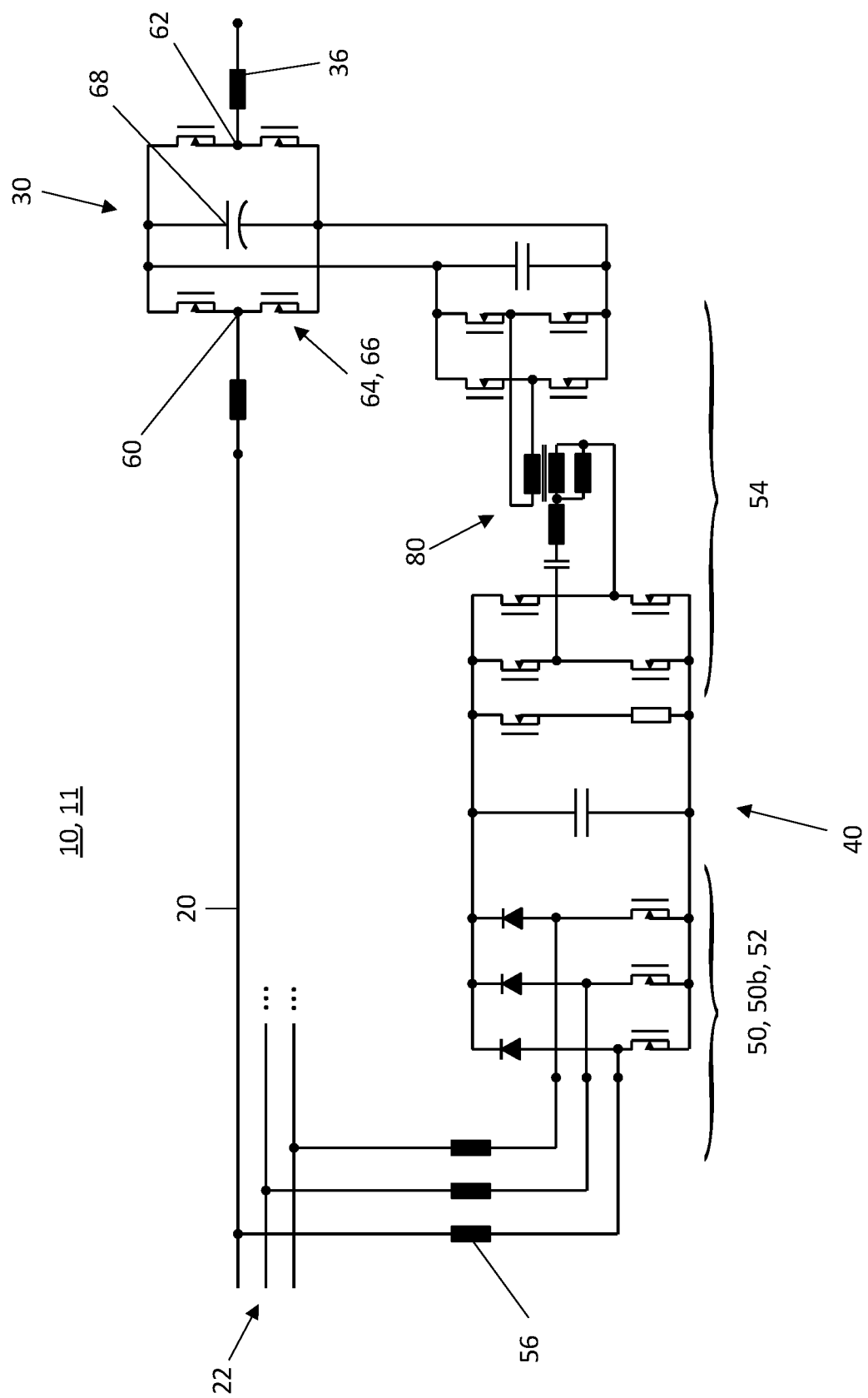
FIG. 4 shows a detailed sketch of an alternative embodiment of a network segment.

FIG. 4 shows a variation of the power flow control module 30 having a power supply unit 40. In the embodiment provided here, the PFC stage 52 is already integrated in the rectifier circuit 50 or a rectifier 50b, and is not designed as a separate stage. In this case, the power supply unit again also comprises a DC-DC converter 54 in order to galvanically isolate the power flow control module 30 and to connect it in a floating manner so that it is at the potential of the line 20. The DC-DC converter 54 has a transformer 80, for example a high-frequency transformer.

Figure 5:
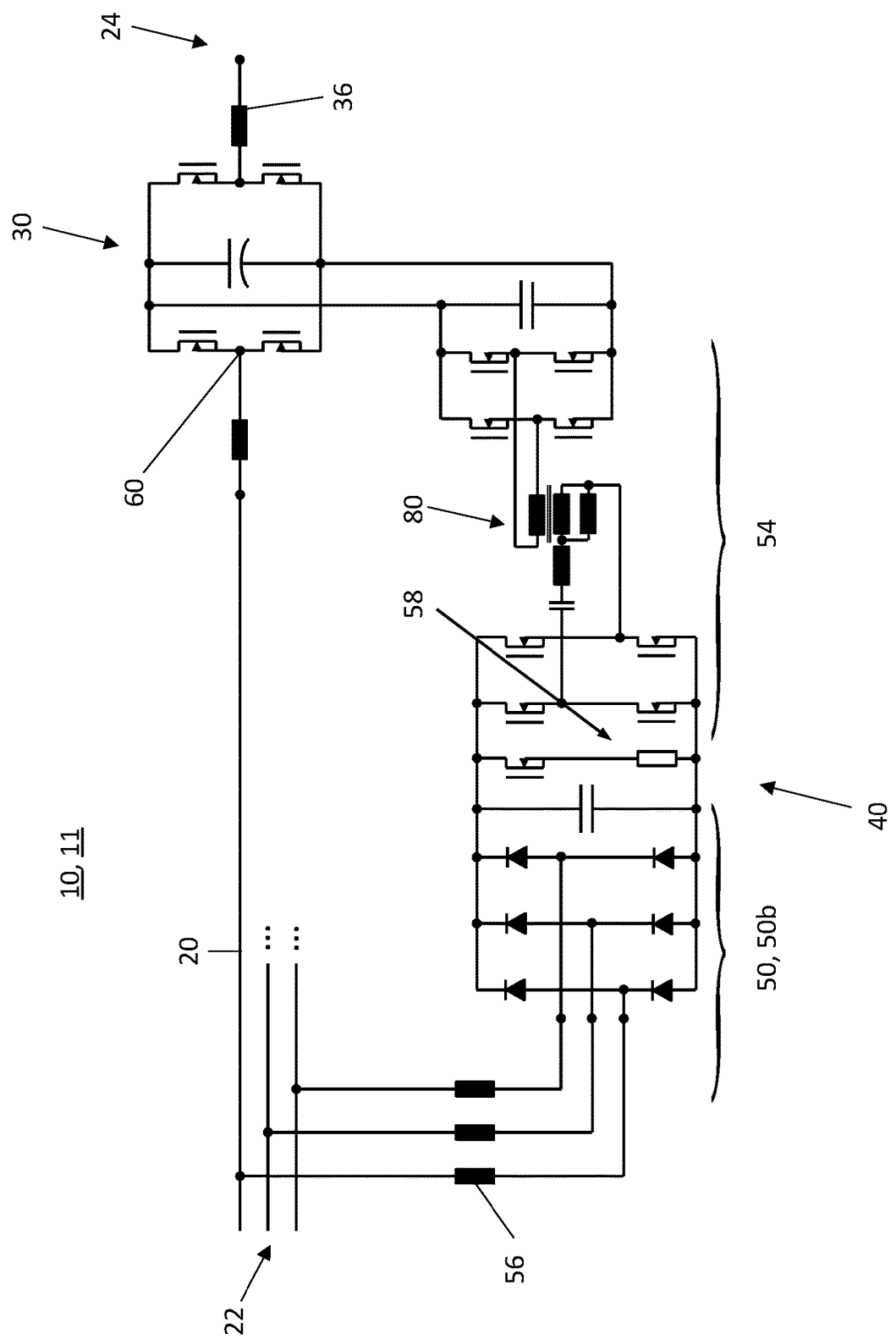
FIG. 5 shows a further detailed sketch of an alternative embodiment of a distribution network segment.

In the embodiment according to FIG. 5, the power supply unit 40, which is installed together with the power flow control module 30 in the distribution network segment 10, comprises a rectifier 50b and a DC-DC converter 54. A heating resistor 58 is arranged between the rectifier 50b and the DC-DC converter 54 and may optionally be controlled. The heating resistor 58 is used to draw and to consume energy from the network segment 10. The heating element 58 is therefore a consumer for energy consumption purposes.

The DC-DC converter 54 of the power supply unit 40 in FIGS. 3 to 5 comprises, inter alia, a transformer 80, which is preferably a high-frequency transformer. The high-frequency transformer is preferably implemented as a PCB transformer or a flat transformer. The transformer may also be implemented by a planar transformer on printed circuit board technology. When using ferrite core materials, for example, very high transformer frequencies may be made possible. The transmitted power increases linearly with frequency over a wide range (depending on the installation space), thus enabling a very compact design in the power supply units.

One alternative to the use of a heating element in the power supply unit is that of forming the power supply units 40 so as to be regenerative. Energy accruing in the floating power flow control modules 30 may thereby likewise be "disposed of". The power supply units 40 accordingly take up the power from the (floating) power flow control modules 30 and feed it into the source of the power supply units 40, that is to say back into the network segment 10 or electrical network 14, or low-voltage distribution network.

Figure 6:
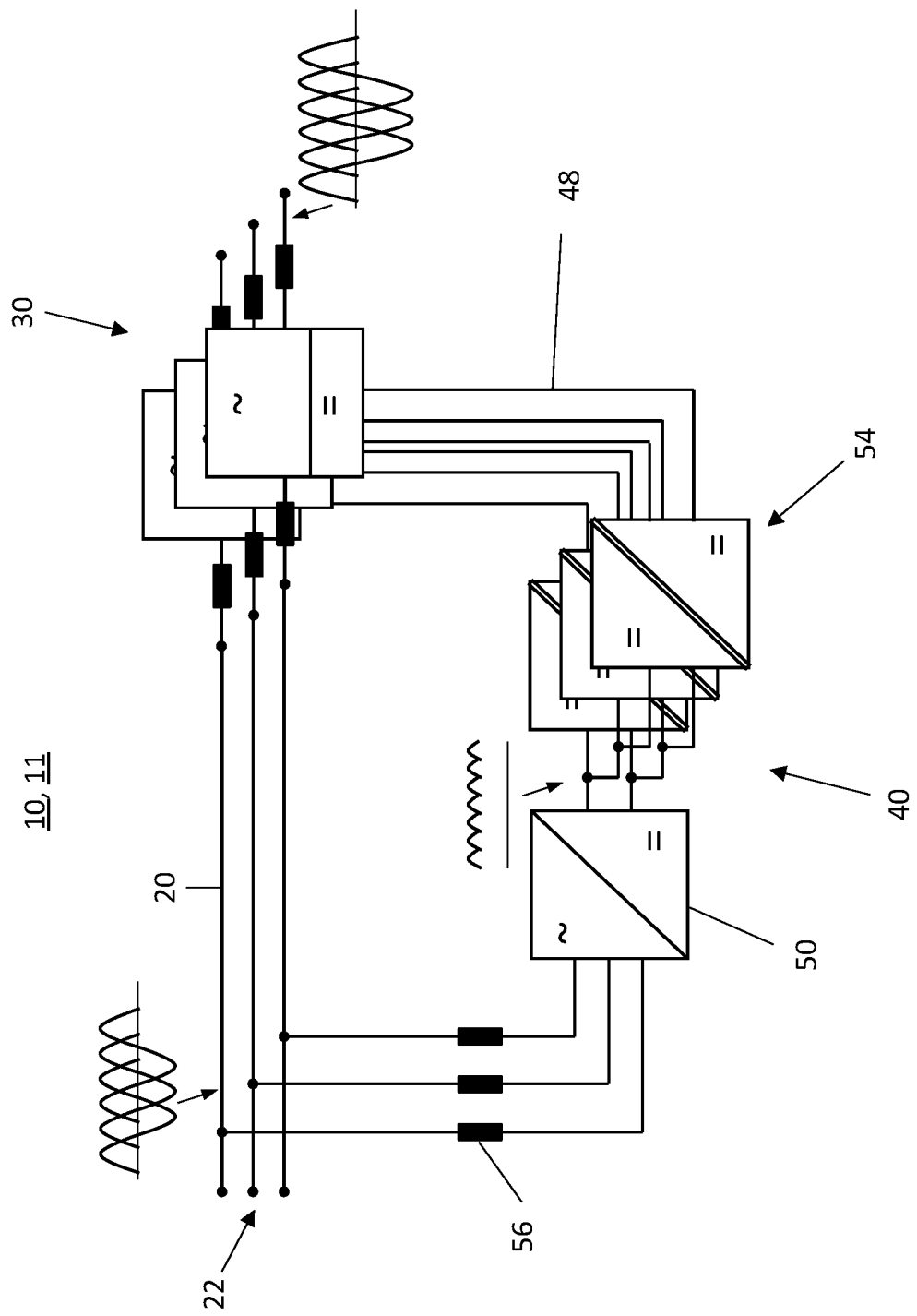
FIG. 6 shows a further basic sketch of a distribution network segment.

FIG. 6 shows a possible variant of regenerative power supply units, these being installed here in the network segment 10 or distribution network segment 11. One possible variant of such regenerative power supply units 40 uses an active front end (AFE). However, this is not the only way to design a power supply unit 40 to be regenerative. A person skilled in the art recognizes that other regenerative power supply unit technologies could also be used. The present disclosure does not exclude these power supply unit technologies, but rather, on the contrary, incorporates them.

As illustrated schematically in FIG. 6, the power supply unit 40 may comprise a rectifier circuit 50 (for example an inverter) and a galvanically insulating DC-DC converter 54, which is designed for example as an LLC stage, which is generally difficult to control in terms of the voltage ratio between input and output, but does not constitute any problem and is sufficient for the present circuit. As an alternative, the DC-DC converter 54 may comprise a dual active bridge (DAB). It may also be seen in FIG. 6 that the power supply unit 40 has a rectifier circuit 50 and three DC-DC converters 54, one for each phase or each line 20 of the distribution network segment 10.

The DC line 48 is used to transmit the power needed to increase the voltage in the phase or line 20 of the network segment 10, which power consists essentially of the added voltage difference multiplied by the current flowing in the line 20. The required power is drawn from the DC-DC converter 54 and the rectifier circuit 50. At the node point between the rectifier circuit 50 and the DC-DC converters 54, there is a possibly pulsating DC voltage in the DC link, which depends on the size of the DC capacitor that is used. For example, this is greater than 400 V, but it may also be greater than 650 V or greater than 750 V.

Figure 7:
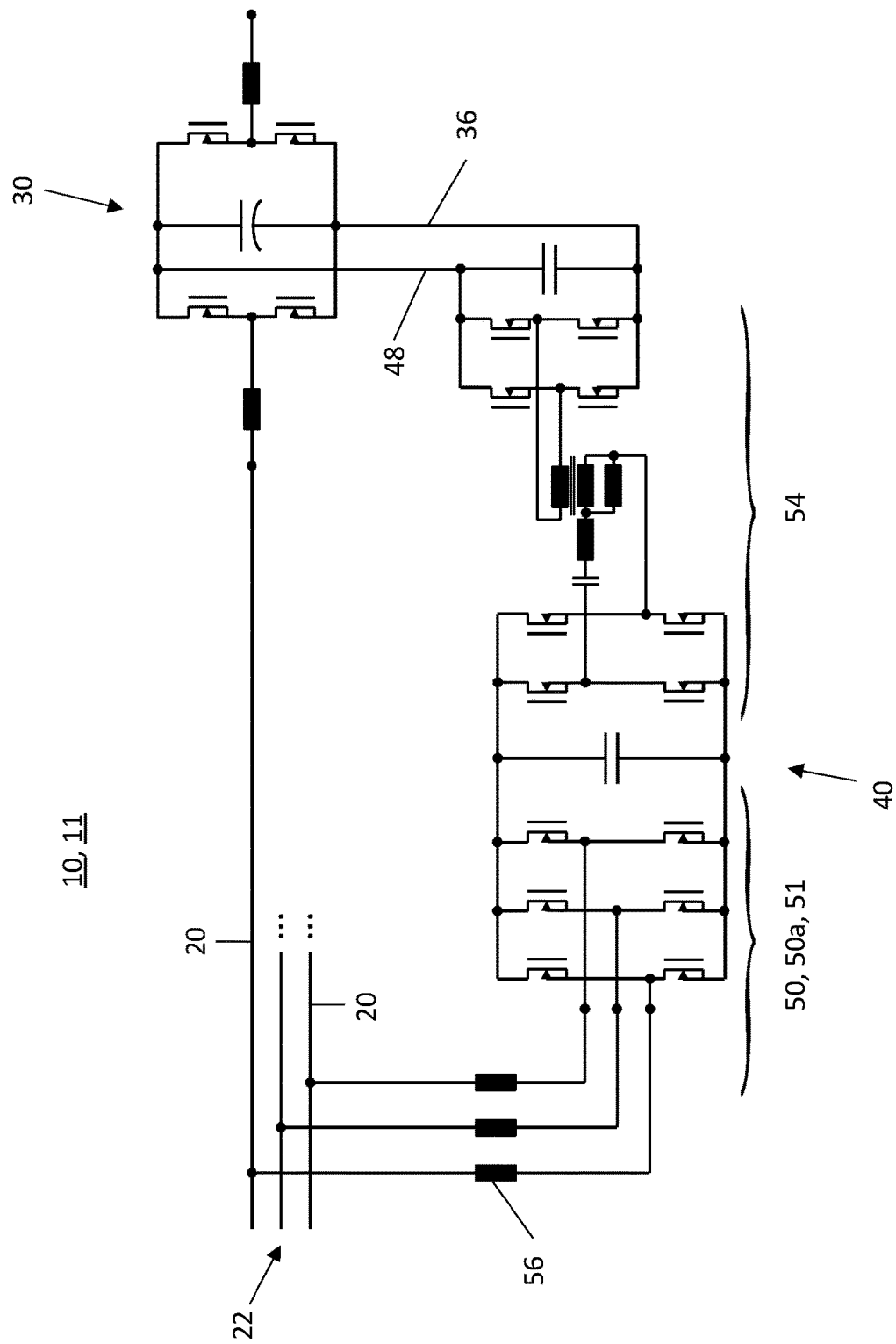
FIG. 7 shows a further detailed sketch of an alternative embodiment of a distribution network segment.

FIG. 7 shows the embodiments of the power supply unit 40 from FIG. 6 in detail with individual components, wherein only one DC-DC converter 54 and one power flow control module 30 for one line 20 are shown here. In a three-phase system, of course, it is necessary to use three galvanically isolating DC-DC converters, one for each phase or for each power flow control module 30, and in any case one DC-DC converter with an isolated output per phase or per power flow control module. The rectifier circuit 50 is designed here as a bidirectional active front end 51. This also allows energy to be fed back into the network.

Figure 8:
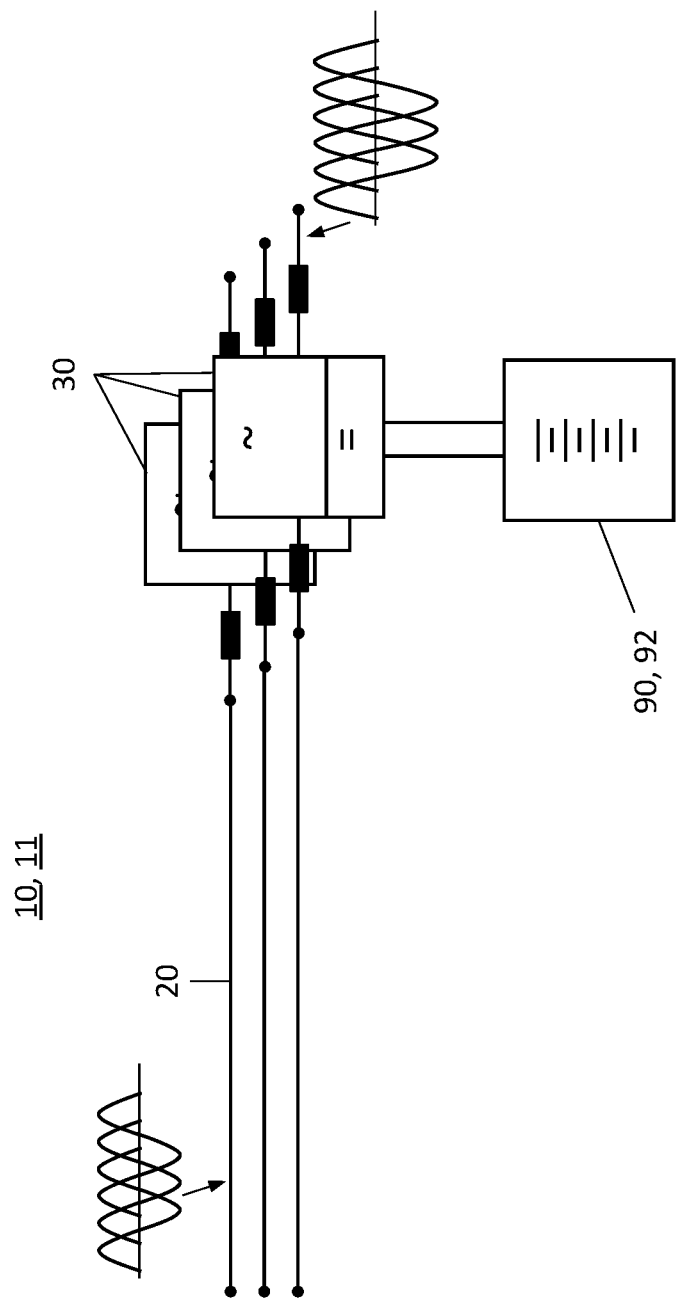
FIG. 8 shows an alternative distribution network segment having a power flow control module and battery.

FIG. 8 shows an embodiment of a power flow control module 30 having a battery 90 as energy source 92 for the power flow control modules 30. In a three-phase system in which three power flow control modules 30 are used, one per line 20, a single battery may however be used. At the same time, the battery 90 may serve as a load in order to take up energy and thus withdraw it from the system.

The variant having a battery takes into account the fact that both a voltage drop in a mesh of an electrical network 12 (low-voltage distribution network 14) or in a network segment 10 (distribution network segment 11) and the need to limit the power feed from weak other supply lines are associated with a high power requirement in the network segment. On the other hand, it is taken into account that a voltage rise with an unexpectedly low load or with an unfavorably high infeed, which may be brought about for example by braking drives or solar installations, perfectly matches the requirements of a network storage unit (also referred to as a network storage). A battery thus makes it possible to dispense with complicated and expensive but potentially regenerative power supply units.

Figure 9:
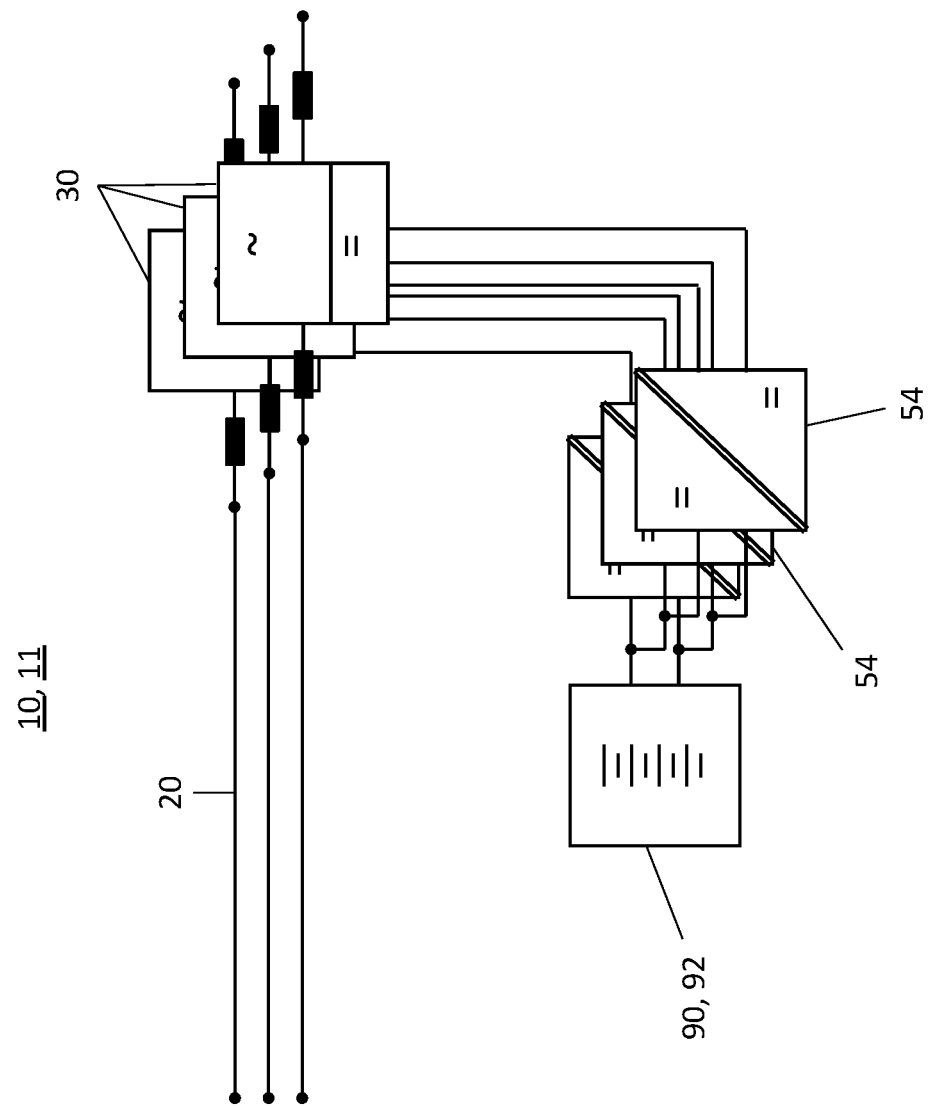
FIG. 9 shows an alternative embodiment of the distribution network segment according to FIG. 8.

The battery 90 may be connected directly to the individual power flow control modules 30 (FIG. 8) or via a galvanically isolated additional DC-DC converter 54 (FIG. 9).

Preferably, a battery 90 is used, per power flow control module 30, with sufficient capacity, as is provided in network energy storage units. There is no need for an energy exchange between individual batteries 90 if the asymmetries drift over time.

Figure 10:
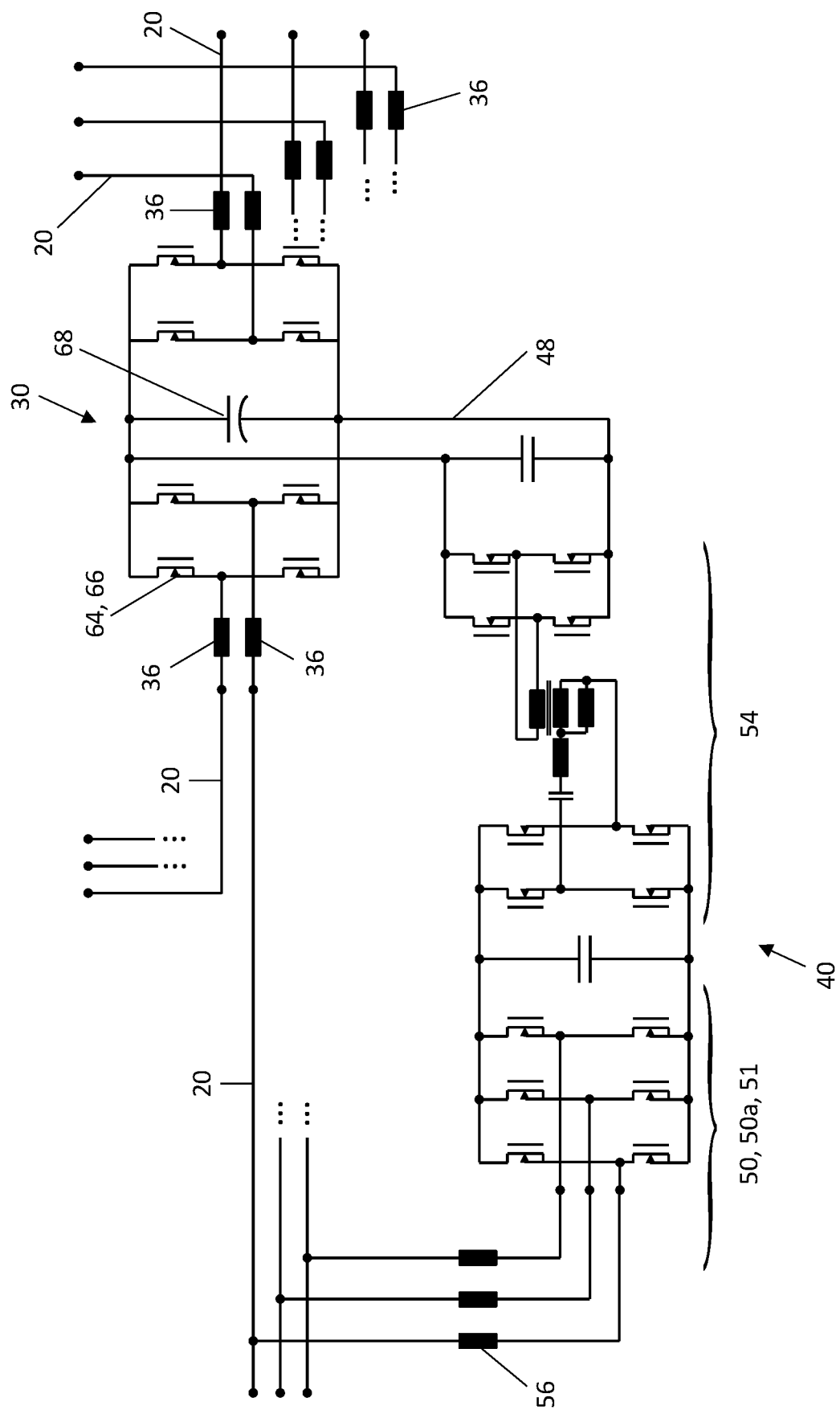
FIG. 10 shows an alternative embodiment of a distribution network segment having a power flow control module.

FIG. 10 shows a further preferred embodiment of a power flow control module 30 that comprises multiple inputs and outputs, that is to say multiple first module connections 60 and multiple second module connections 62. In this case, the power flow control module 30 comprises multiple switching elements 64 or transistors 66, for example FETs, designed in the form of half-bridges. In this case, the power flow control modules 30 may each operate as "low-voltage energy routers" and thus carry out N-to-M routing. The power flow control modules 30 may in this case distribute power, like a switch, between N inputs (first module connection 60) and M outputs (second module connection 62) by generating any voltage gradient between the M×N taps. This preferably takes place within the intermediate circuit voltage levels of the series-connected power flow control modules 30, that is to say for example with at most +/−48 V at 48 V or at most +/−24 V at 24 V. Strictly speaking, the power flow control modules 30 in this case no longer distinguish between inputs and outputs (first module connection 60 or second module connection 62) due to symmetry. The compact power electronics mesh current controller, as described here, thus becomes a kind of gateway or router. However, it is also important here that there is still no galvanic reference to the other phases or lines 20 and in particular also no galvanic reference to ground potential. The inputs and outputs should likewise be very close to one another in terms of phase.

The power supply unit 40 preferably comprises a bidirectional active front end 51 as rectifier circuit 50 or inverter and a DC-DC converter 54.

The present disclosure has been described and explained comprehensively on the basis of the drawings and the description. The description and explanation should be understood as an example and not as being restrictive. The present disclosure is not limited to the disclosed embodiments. Other embodiments or variations will be apparent to a person skilled in the art when using the present disclosure and also upon detailed analysis of the drawings, the disclosure and the following patent claims.

In the patent claims, the words "comprise" and "having" do not exclude the presence of other elements or steps. The indefinite article "a" or "an" does not exclude the presence of a plurality. A single element or a single unit may perform the functions of several of the units specified in the patent claims. The mere mention of some measures in multiple different dependent patent claims should not be understood to mean that a combination of these measures cannot likewise be used to advantage. Reference signs in the patent claims should not to be understood to be limiting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A power flow control system for an electrical network and for adjusting a voltage or a current in a line of the electrical network, the power flow control system comprising:
   a power flow control module, the power flow control module comprising:
      at least two module connections configured to connect to the line of the electrical network;
      a plurality of switching elements;
      an energy storage; and
      two energy connections; and
   a galvanically isolating power supply that is connected to the energy connections, wherein:

a first module connection and a second module connection, of the at least two module connections, are designed to electrically connect the power flow control module in series with the line, two of the switching elements are connected in series and are connected in parallel with the energy storage, the power flow control module is interconnected such that it is at a potential of the line of the electrical network and is galvanically isolated from a ground potential or another line of the electrical network, the switching elements are designed to increase or reduce an amplitude of the voltage in the line in order to adjust the voltage, to shift a phase of the voltage, or to control a current flow in the line, and the galvanically isolating power supply comprises a DC-DC converter, which comprises a high-frequency transformer.

2. The power flow control system as claimed in claim 1, wherein an absolute value of the voltage provided by the power flow control module for changing the amplitude of the line is at most one third of the network rated peak voltage.

3. The power flow control system as claimed in claim 1, wherein that an absolute value of the voltage provided by the power flow control module for changing the amplitude of the line is at most 100 volts.

4. The power flow control system as claimed in claim 1, wherein the switching elements are interconnected in a form of two half-bridges and are designed as low-voltage trench transistors.

5. The power flow control system as claimed in claim 1, wherein at least one of the switching elements comprises at least one field-effect transistor.

6. The power flow control system as claimed in claim 1, wherein the power flow control module is configured to shift a phase between the two module connections that are connected to the line both in the negative direction and in the positive direction.

7. The power flow control system as claimed in claim 1, wherein the power flow control module is configured to be operated in a voltage-controlled manner or is configured to be used as a current-controlled voltage source.

8. The power flow control system as claimed in claim 1, wherein the switching elements are clocked.

9. The power flow control system as claimed in claim 1, wherein the switching elements are clocked at a switching rate of at least 20 kHz.

10. The power flow control system as claimed in claim 9, wherein a battery is connected to the energy connections by way of the DC-DC converter.

11. The power flow control system as claimed in claim 1, wherein the galvanically isolating power supply is fed from the electrical network.

12. The power flow control system as claimed in claim 1, wherein the galvanically isolating power supply comprises a rectifier circuit.

13. The power flow control system as claimed in claim 1, wherein the galvanically isolating power supply is at least one bidirectional active front end.

14. The power flow control system as claimed in claim 1, wherein the power flow control module comprises a heating element.

15. The power flow control system as claimed in claim 1, wherein the frequency of the high-frequency transformer is at least 400 Hz.

16. The power flow control system as claimed in claim 1, wherein the power flow control module comprises an intermediate circuit, wherein a voltage of the intermediate circuit is at most 100 volts DC.

17. A network segment of an electrical network comprising:
a line that is connected to a network transformer and to which multiple consumers or infeed sources are connected; and
a power flow control module, which comprises:
two module connections that are connected to the line of the electrical network,
a plurality of switching elements,
an energy storage, and
two energy connections; and
a galvanically isolating power supply that is connected to the energy connections, wherein:
a first module connection and a second module connection, of the two module connections, are connected to the line such that the power flow control module is connected electrically in series with the line;
two of the switching elements are connected in series and are connected in parallel with the energy storage;
the power flow control module is interconnected such that it is at a potential of the line of the electrical network and is galvanically isolated from a ground potential or another line of the electrical network;
the switching elements are designed to increase or reduce an amplitude of the voltage in the line in order to adjust the voltage, to shift the phase of the voltage, or to control the current flow in the line; and
the galvanically isolating power supply comprises a DC-DC converter, which comprises a high-frequency transformer.

18. The power flow control system as claimed in claim 1, wherein the power flow control system is configured to be selectively operated to use the galvanically isolating power supply to controllably either take an active power from the line and feed it into the energy store or, conversely, to take power from the energy store and feed it into the line.

* * * * *